(12) United States Patent
Lewis et al.

(10) Patent No.: US 7,286,747 B1
(45) Date of Patent: Oct. 23, 2007

(54) DIGITAL VIDEO APPARATUS USER INTERFACE

(75) Inventors: Debbie Indira Lewis, Norcross, GA (US); Pratish Ratilal Desai, Fremont, CA (US); Robert Howard Miller, Leawood, KS (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/743,649

(22) PCT Filed: Jul. 20, 1999

(86) PCT No.: PCT/US99/16381

§ 371 (c)(1),
(2), (4) Date: Apr. 11, 2001

(87) PCT Pub. No.: WO00/04726

PCT Pub. Date: Jan. 27, 2000

Related U.S. Application Data (60) Provisional application No. 60/093,423, filed on Jul. 20, 1998.

(51) Int. Cl.
*H04N 5/93* (2006.01)
(52) U.S. Cl. .................. 386/52; 386/105; 386/106; 386/125; 386/126; 360/13
(58) Field of Classification Search .................. 386/52, 386/94, 125–126, 1, 69, 96, 53, 55, 124, 386/104, 105, 106, 95; 368/10; 360/60
See application file for complete search history.

(56) References Cited

U.S. PATENT DOCUMENTS

| | | | | |
|---|---|---|---|---|
| 4,569,026 A | * | 2/1986 | Best | 715/716 |
| 4,659,026 A | * | 4/1987 | Krause et al. | 241/275 |
| 5,063,547 A | * | 11/1991 | Custers et al. | 369/30.03 |
| 5,499,221 A | * | 3/1996 | Ito et al. | 369/53.22 |
| 5,625,864 A | * | 4/1997 | Budow et al. | 725/82 |
| 5,974,219 A | * | 10/1999 | Fujita et al. | 386/52 |
| 6,064,380 A | * | 5/2000 | Swenson et al. | 715/500.1 |

(Continued)

FOREIGN PATENT DOCUMENTS

EP          0910088          4/1999

*Primary Examiner*—John Miller
*Assistant Examiner*—Jamie J Vent
(74) *Attorney, Agent, or Firm*—Joseph J. Laks; Robert D. Shedd; Catherine A. Ferguson (57) ABSTRACT

A method of controlling a system for processing stored information on a storage medium includes the following steps. Stored information is played back during a play mode of operation. A user is provided an opportunity to select a bookmark representing a corresponding location within the stored information, from among a plurality of bookmarks, responsive to user input. Playback is changed to from the location corresponding to the selected bookmark during the play mode of operation. Apparatus for processing information stored on a storage medium includes playback circuitry for retrieving information from the storage medium during a play mode of operation. A user control device receives user input. Control circuitry selects a bookmark, corresponding to a location in the retrieved information from the storage medium, in response to the user input, and conditions the playback circuitry to retrieve information from the storage medium starting at the location corresponding to the selected one of a plurality of bookmarks during the play mode of operation.

11 Claims, 6 Drawing Sheets

U.S. PATENT DOCUMENTS 6,370,323 B1 * 4/2002 Adolph et al. .............. 386/104
6,434,097 B1 * 8/2002 Lewis et al. ............. 369/47.11
6,591,058 B1 * 7/2003 O'Connor et al. ............ 386/65

* cited by examiner

DIGITAL VIDEO APPARATUS USER INTERFACE

This application claims the benefit under 35 U.S.C. § 365 of International Application PCT/US99/16381, filed Jul. 20, 1999, which claims the benefit of U.S. Provisional Application Ser. No. 60/093,423, filed Jul. 20, 1998.

The present invention relates to a user interface for a digital video apparatus, and in particular, a user interface for a digital video apparatus capable of processing data blocks having position information included therewith, wherein the digital video apparatus can navigate through the data blocks based on position related information.

Video signal processing systems that utilize storage media having digitally compressed video and audio information recorded thereon can give the user a vast number of options for controlling playback of a video title stored on such a media. One such system that is gaining rapid acceptance comprises a video disc player adapted to process information stored in accordance with the digital video disc (DVD) specification. The information on a DVD formatted disc is recorded as discrete packets of data, in accordance with the applicable video and audio data compression standards, wherein designated packets carry data associated with various data streams, such as alternative video angles, audio tracks, subpicture streams, etc. A disc player reading a DVD formatted disc may be controlled to display certain packets of data and skip over others. In this manner, the DVD system can be used to prevent unauthorized access to information on a particular disc as well as seamlessly provide multiple variations of a video title, such as multiple camera angles and story endings, in accordance with user commands.

Each data packet or designated block of data packets also carry control information specifying the location of the data packet or block of data packets on the disc. One useful aspect of including location information in the data is that a disc player can be controlled to start and/or stop playback from a designated location on the disc.

DVD formatted discs are generally authored to include one or more video titles, wherein each video title corresponds to a designated program unit such as a movie or a television episode. Each video title may in turn be divided into one or more part-of-title units, also called chapters, wherein each chapter corresponds to a predetermined portion of the video title.

To assist the user in navigating through a disc, a menu or a set of menus are authored onto a disc. A disc menu usually lists the available video titles and a video title menu usually lists the available chapters on a particular video title. The menus are usually configured such that the user can begin playback from the starting point of a selected video title or chapter.

However, these menus do not allow the user to select an arbitrary point within a video title or chapter for starting playback. For example, a user may have a favorite point in the middle of video title or a chapter in which to start playback. The user also may wish to avoid the inconvenience of manipulating the fast forward or reverse commands to reach the precise point desired. The user may also have a plurality of such favorite points located throughout the disc or within a video title. It can be seen that locating each of the desired points during playback can quickly become cumbersome and annoying. Therefore, what is needed is a user interface, apparatus and method which allows the user to avoid the inconvenience of having to manipulate the various transport keys in order to locate and start playback from a selected location within a video title or chapter.

U.S. Pat. No. 5,063,547 discloses an apparatus for reproducing a user defined preferred selection program from data stored on a compact disc. The disclosed apparatus is adapted to identify a particular disc from the sub-code on the disc. A user identification may also be stored in the player. The user identification and the disc identification are combined to form one identification code that may be associated with a preferred selection program stored in the memory. The preferred selection program may comprise track number selections, time within a track number or absolute time. A display included in the apparatus provides an indication of the selected choice.

In accordance with principles of the present invention, a method of controlling a system for processing stored information on a storage medium includes the following steps. Stored information is played back during a play mode of operation. A user is provided an opportunity to select a bookmark, representing a corresponding location within the stored information, from among a plurality of bookmarks, responsive to user input. Playback is changed to the location corresponding to the selected bookmark during the play mode of operation. Apparatus for processing information stored on a storage medium includes playback circuitry for retrieving information from the storage medium during a play mode of operation. A user control device receives user input. Control circuitry selects a bookmark, corresponding to a location in the retrieved information from the storage medium, in response to the user input, and conditions the playback circuitry to retrieve information from the storage medium starting at the location corresponding to the selected one of a plurality of bookmarks during the play mode of operation.

The invention will be described with reference to the accompanying drawings, wherein.

Although the exemplary embodiment is described with reference to a digital video apparatus adapted to read compressed video and audio data from a disc and to process the data in accordance with the DVD specification, it is to be understood that the present invention may be used in any digital video apparatus capable of processing digital video and audio data, wherein the data is stored or received in packetized form with location information included therewith such that the digital video apparatus can quickly locate a particular data block and begin playback from a selected location.

Figure 1:
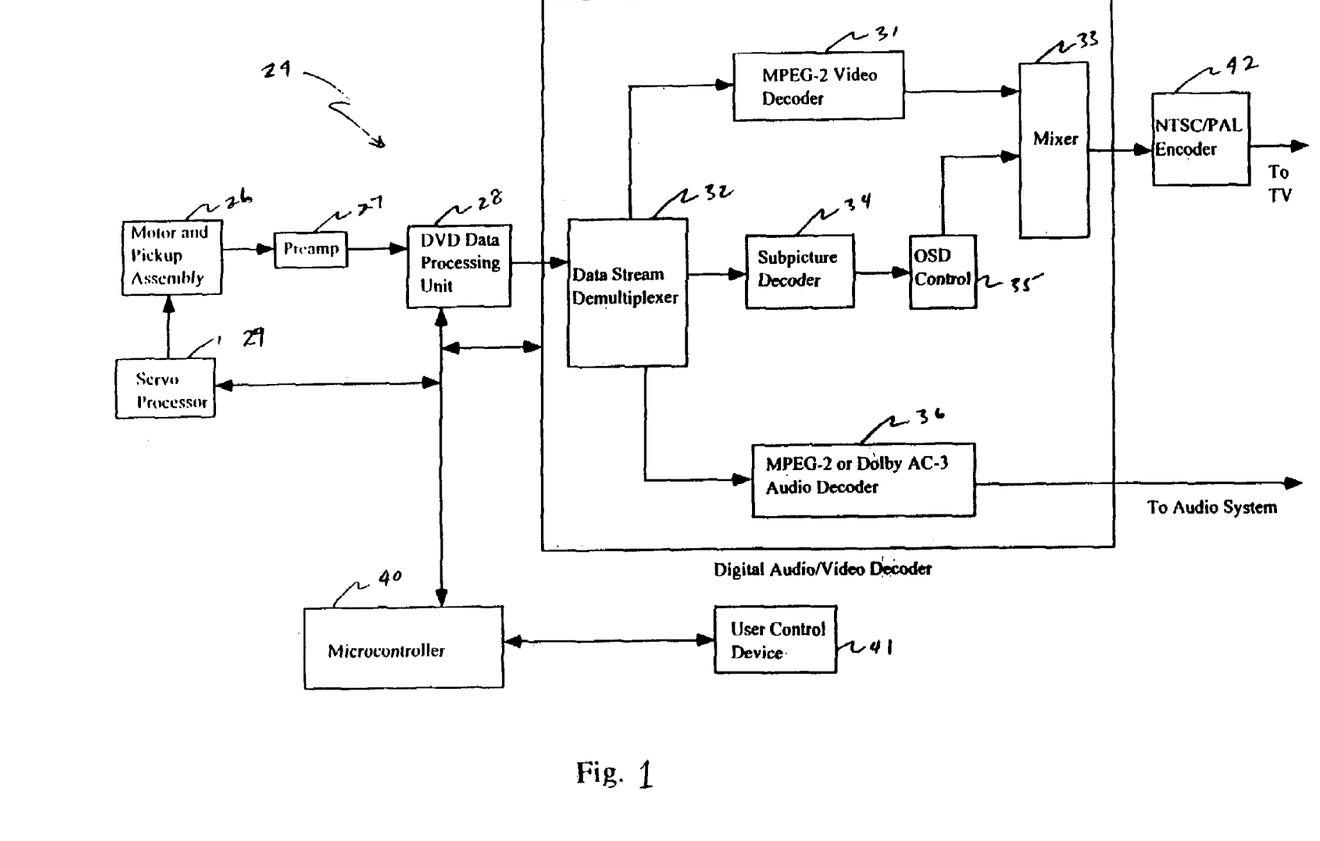
FIG. 1 is a block diagram of a digital video disc player suitable for implementing the bookmark feature of the present invention.

FIG. 1 is a block diagram showing the basic elements of an exemplary digital video disc player suitable for use in implementing the bookmark feature of the present invention. The construction and operation of these elements are known to one of ordinary skill in the art and will not be discussed in detail here. Disc player 24 comprises motor and pickup assembly 26 which, under the control of servo processor 29, spins the disc and reads the information stored thereon. Preamp 27 and DVD data processing unit 28 translate the electrical pulses from motor and pickup assembly 26 into digital data that can be further processed by digital audio/video decoder unit 30. DVD data processing unit 28 typically performs functions such as demodulation, error correction and descrambling of the raw data read from the disc so that the data is in a suitable format for decoder unit 30.

Decoder unit 30 receives the demodulated, error corrected and descrambled data, processes the data, and provides the appropriate video and audio signals to a display unit, such as a television set. Decoder unit 30 comprises data stream demultiplexer 32 which demultiplexes the data from data processing unit 28 into a plurality of separate data streams, including a video stream, an audio stream and a subpicture stream, and provides the data streams to their respective data decoders. Video decoder 31 receives the video stream and provides a video signal to mixer 33. Subpicture decoder 34 receives the subpicture stream and provides data to on-screen display (OSD) control 35 which provides OSD video signals to mixer 33. The combined video signal from mixer 33 is provided to NTSC/PAL encoder 42 which provides a video signal that conforms to the appropriate video signal standard to a video display device. Audio decoder 36 receives the audio streams from data stream demultiplexer 32 and provide the appropriate audio signals to an audio system.

Microcontroller 40 controls the operation of disc player 24. Microcontroller 40 is coupled to user control device 41, which may comprise IR remote control devices, front panel buttons or the like, and translates data from user control device 41 to control the operation of the various elements of disc player 24 described above. Microcontroller 40 may include a memory or may be coupled to a memory for storing various tables that determine the presentation sequence of data retrieved from a disk. Typically, microcontroller 40 is also configured to control various access features of disc player 24 including, but not limited to, parental lock out, decryption of encrypted discs, dialing remote controllers to gain access to encrypted discs. Microcontroller 40 may be embodied in various forms, including, but not limited to, a dedicated integrated circuit, or a part of a decoder/controller unit. Microcontroller 40 may be comprised of one of a plurality of suitable controller units, including, but not limited to STI 5500, manufactured by SGS Thomson.

Figure 2:
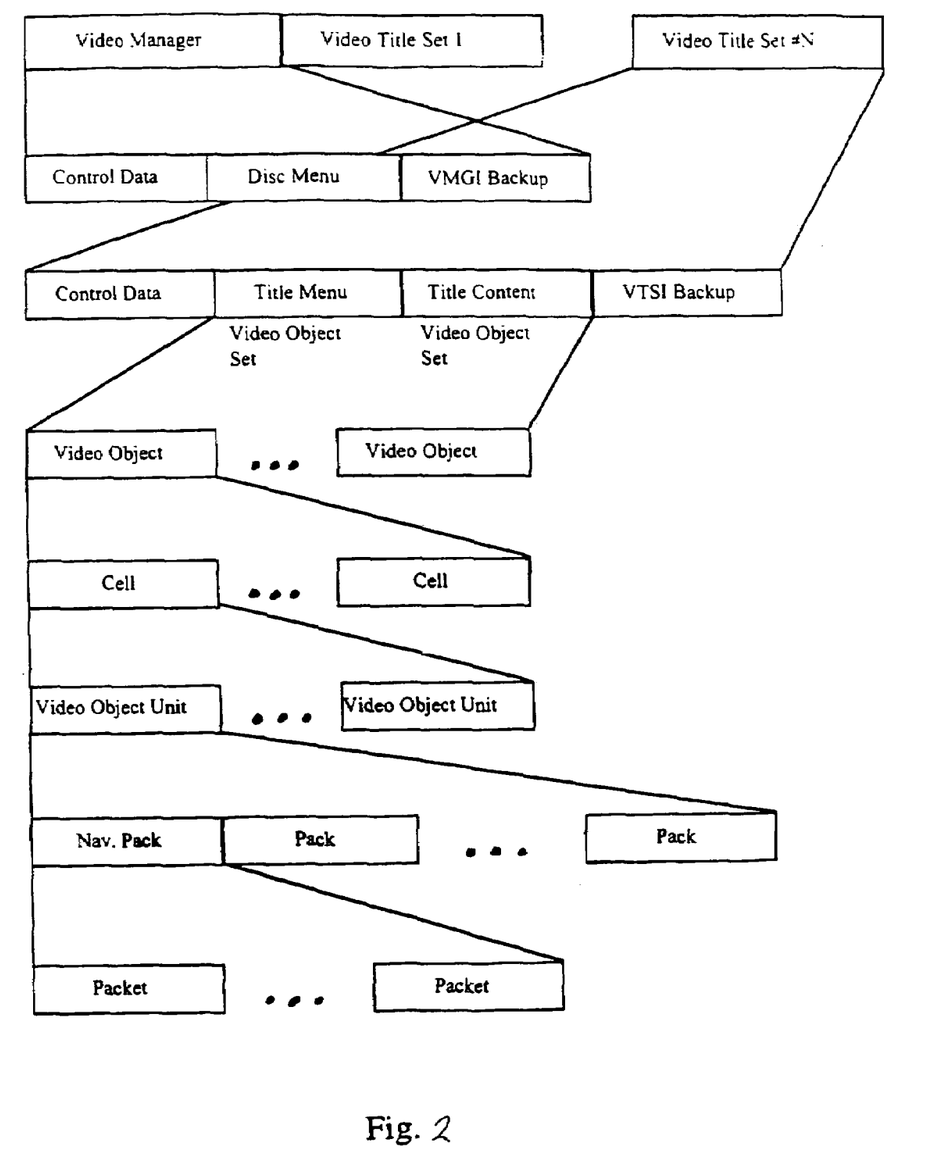
FIG. 2 is a diagram of a data structure in accordance with the DVD specification.

FIG. 2 illustrates the structure of the program data and control data stored on a disc in accordance with the DVD specification and suitable for use with disc player 24. The data structure is hierarchical, wherein each data block is divided up into component data blocks, which are further divided into smaller component data blocks. Each video title set, which corresponds to a designated program unit, for example, a movie or an episode of a television show, is comprised of video object sets, which comprises a plurality of video objects.

Each video object is comprised of a plurality of cells, which may be considered a data unit for presentation having a plurality of data unit types, such as video, audio, subpicture, etc, and corresponds to a program segment. Each cell is in turn comprised of a plurality of video object units (VOBUs). Each VOBU is comprised of a navigation pack (NAV_PACK) and a plurality of packs, which are subdivided into a plurality of packets. A VOBU generally corresponds to an MPEG-2 Group of Pictures (GOP) with an associated control data structure, the NAV_PACK. The NAV_PACK of each VOBU contains information such as sector addresses of VOBUs relative to the current one (both forwards and backwards in temporal presentation order), and the amount of elapsed time in cell presentation which corresponds to the current VOBU.

Figure 3:
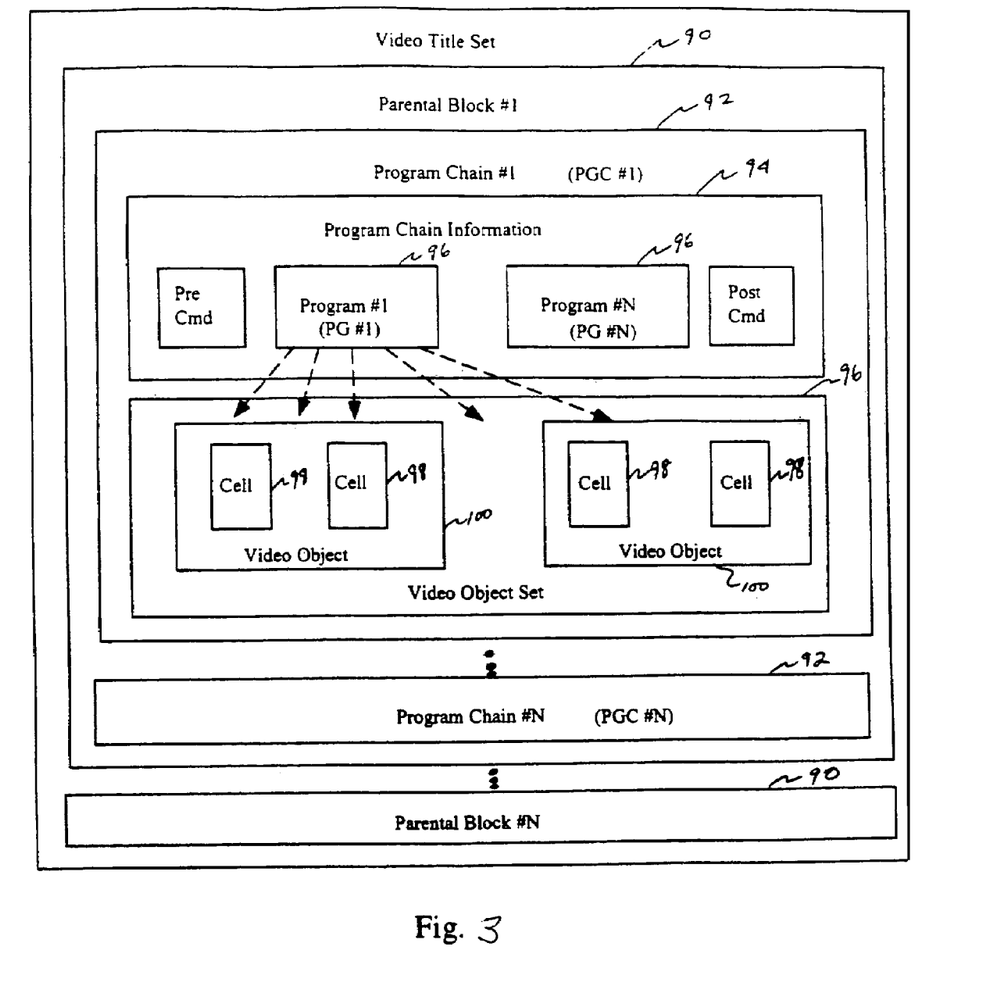
FIG. 3 is a block diagram of a presentation structure in accordance with the DVD specification.

Data stored in accordance with the DVD specification is also logically organized into a presentation structure in order to provide flexibility in the manner in which the data can be presented. FIG. 3 illustrates the presentation structure in accordance with the DVD specification and suitable for use with disc player 24. This presentation structure is overlaid onto the data structure of FIG. 2. At the base level, the presentation sequence is defined by programs (PGs) 96, each of which comprise a linked list of pointers to cells. A plurality of PGs 96 may be combined to form a program chain information (PGCI) 94, a plurality of which may in turn be combined to form program chain (PGC) 92.

During presentation of a video titles, disc player 24 selects the appropriate PGC for loading into a primary table, based on such criteria as the user selected title and parental rating preference. Thereafter, disc player 24 reads the data stored on the disc based on the linked list of pointers contained in the PGs. As is known, disc players generally utilize various look ahead algorithms in order to read the data from the disc and store the data on a system buffer prior to actual presentation in order to provide seamless presentation.

Different versions of a video title set, corresponding to different parental control ratings, may be provided by the disc author to enable disc player 24 to seamlessly branch between various scenes to provide multiple playback sequences for a particular video title set. The seamless branching is achieved by linking and displaying the desired cells, programs and program chains as desired.

Figure 4:
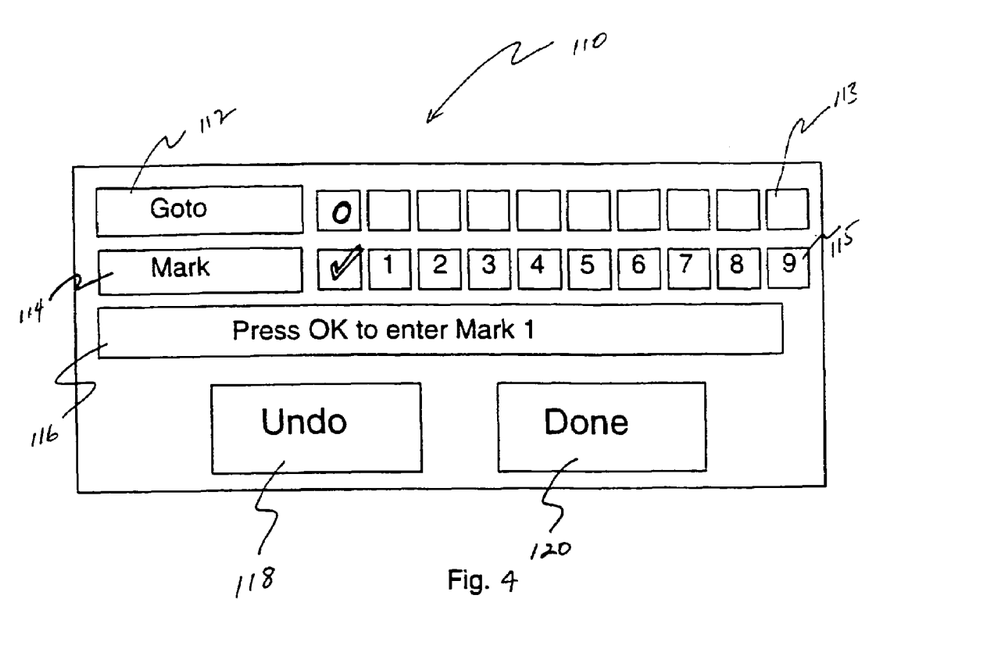
FIG. 4 is an on-screen display suitable for use with the bookmark feature of the present invention.

As noted above, the present invention recognizes that annoyance and inconvenience may be caused if a user is forced to repeatedly manipulate the transport keys in order to find a particular scene in a video title. Therefore, the present invention provides a user interface, apparatus and method for allowing a user to select a plurality of bookmarks for a particular disc and start playback from a selected one of the bookmarks. An on-screen display 110 suitable for implementing the present user interface is shown in FIG. 4. Display 110 is shown on a portion of the display device while the video title continues to play in another portion of the display, such as the background. The user is able to select the options on display 110 as the video title playback continues.

Display 110 includes bar 112 having a plurality of buttons 113 for allowing the user to select a bookmark with which to begin playback, and bar 114 having a plurality of buttons 115 for setting and erasing bookmarks. Each button 115 has a corresponding button 113 positioned directly above it. A user can direct disc player 24 to go to a particular bookmark and begin playback from that point by selection the appropriate button 113. An item on display 110 may be selected using one of a plurality of conventionally known methods such as using cursor control keys on a remote control device or a keyboard to move a highlight or a cursor on the display. As shown in FIG. 4, display 110 allows the user to select up to 10 bookmarks for a particular disc.

Text display 116 provides user prompts to assist the user in navigating through display 110, and in particular, setting and erasing the bookmarks. Undone button 118 reverses the operation of the previous marking or unmarking function selected by the user. Done button 120 allows the user to exit from display 110.

The operation of the present user interface is as follows. Microcontroller 40 generates display 110 in response to a designated user input, for example, pressing a particular button in a remote control or selecting a particular button on an on screen display. The user selects the desired one of buttons 115 to set a bookmark or erase a bookmark. If the user selects one of buttons 115, text display 116 indicates that the user can set a bookmark by pressing the "OK" key on remote control device 41. Advantageously, display 110 may be arranged to allow the user to enter a text description of the bookmarked point so that when the user selects a button 115 at a later time, text display 116 displays the user entered text description associated with that bookmark. If the user wishes to clear the bookmark, the user selects button 118. In order to jump back and begin playback from a particular bookmark, the user selects the appropriate button 113. The present user interface may be modified to require the user to press a confirmation key, such as an "OK" key, to begin playback from a selected bookmark.

In a further embodiment, disc player 24 may include a non-volatile storage device for storing a plurality of bookmarks. Display 110 may be modified to include an identification number of the bookmark set, wherein a user may call up a particular set of bookmarks associated with a specific disc. In this manner, a collection of bookmarks may be maintained and accessed by microcontroller 40 as required by the user.

Advantageously, the present bookmark feature is implemented on disk player 24 by utilizing the Resume function specified in the DVD specification. According to the DVD specification, when the user pauses the presentation of a program, disk player 24 stores in memory various data associated with the stopping point. The data includes, but is not limited to, the nearest NAV_PACK address, the chapter number and the title number. When the user resumes play of the program, disk player 24 launches a user operation resume wherein disk player 24 retrieves the data associated with the stopping point, including the nearest NAV_PACK address and restarts presentation at that NAV_PACK address. In the present invention, when the user specifies a bookmark point, disk player 24 saves, in an auxiliary table, the data that would be saved if the user had specified a pause in the presentation. However, unlike a stop and start sequence, disk player 24 continues presentation of the program. Each time the user specifies a bookmark, the data associated with the bookmark is saved in a similar fashion. Subsequently, when the user specifies playback from a particular bookmark, disk player 24 retrieves the navigation information associated with that bookmark from the auxiliary table and launches the user operative resume to start presentation from the bookmarked point. In this manner, the present invention extends the resume function specified in the DVD specification.

In the illustrated embodiment, referring to FIG. 4, there are a total of 10 bookmarks allowed in a set for a particular disk conforming to the ten buttons on display 110 (buttons 113 and 115 of FIG. 4). Respective sets of bookmarks are identified and stored by identification number for each bookmark set, wherein the user may store and then retrieve a particular set of bookmarks associated with a specific disk. For example, a user can have a favorite part of a video in the middle of a chapter in the video and bookmark that portion. That is, the user may set a bookmark for that location and select that bookmark to begin playback of the video at the favorite part using the display of FIG. 4.

It is also possible to have a certain favorite part of a video that the user wants played over and over. Thus, the feature of saving two bookmarks and have continual playback between the two points is also a feature that the user can use. As described above, the user may set a bookmark for the starting location, and another bookmark for the ending location of the favorite part. The user may then specify that playback of the video begin at the first bookmark, and end at the second bookmark. This playback can, optionally, be continually repeated.

The bookmarks, and sets of bookmarks, may be stored in non-volatile memory so that bookmarks for a certain disk can be selected and saved with respect to the particular disk, and later retrieved when that disk is played again. The Undo button (button 118 of display 110 of FIG. 4) allows the user to undo the previous operation of marking or unmarking a bookmark. Thus, an accidental marking or unmarking can be undone without having to re-navigate display menu 110.

Figure 5:
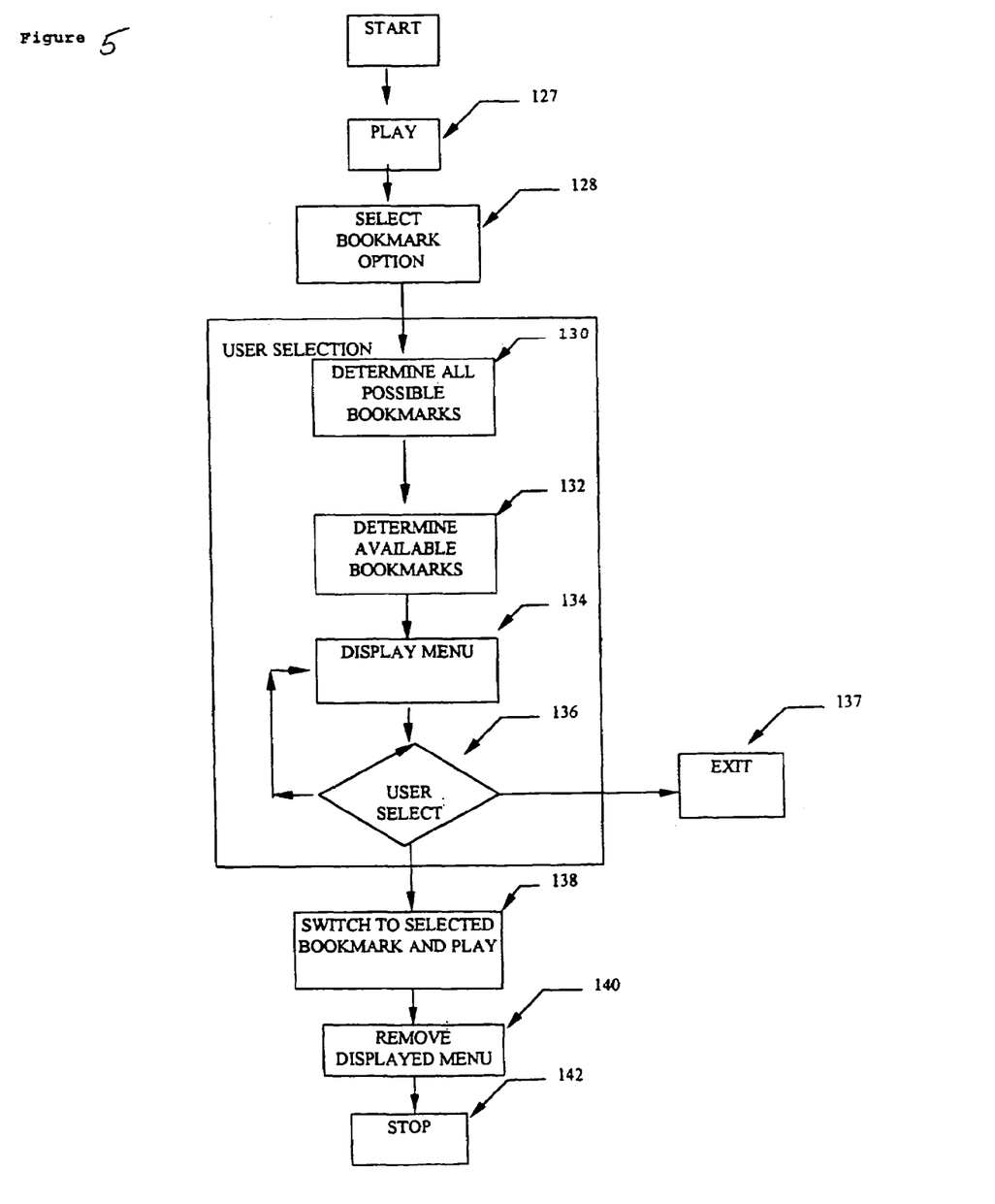
FIG. 5 is a flowchart illustrating the steps for implementing the displaying and dynamically selecting among particular ones of a plurality of bookmarks on a DVD Player.

A flowchart illustrating the steps for implementing the displaying and dynamically selecting among particular ones of a plurality of bookmarks on a DVD Player is shown in FIG. 5. In step 127, disc player 24 waits for the user to send a PLAY command and upon receiving the PLAY command searches the disk player's non-volatile memory for a set of bookmarks for this particular disk. In step 128, the user accesses the bookmark functions. In step 130, disk player 24 determines all previously saved bookmarks with respect to the particular disk. In step 132, disk player 24 determines what bookmarks are available, i.e., those bookmarks not blocked with a parent block or those not disabled. In step 134, an on-screen display 110 is overlaid, in a known manner, onto the video and audio display generated by the disk player 24 displaying the allowable bookmarks, and allowing the user to set and clear bookmarks, as well as initiate play from available bookmarks, while continuing to watch the title playback in a background portion of the video display. The menu display distinguishes between those bookmarks present and available and those that are present and unavailable by not displaying the unavailable bookmarks on display 110. The user, in step 136, can select and clear bookmarks (with 10 stored bookmarks maximum for the displayed set). Step 136 also implements the Undo feature that allows the user to undo the previous operation of marking or unmarking a bookmark in one keystroke. In step 137, the user can decide to exit the routine without switching to play one of a plurality of bookmarks. The menu display tracks the user changes of the available bookmarks that are set, cleared, or selected for play. In step 138, the disk player 24 begins playback at the selected bookmark. In step 140, after disk player 24 switches to and plays the new bookmark, the on-screen display 110 is no longer overlaid onto the video and audio display generated by the disk player 24 and the video signal processing system returns to a normal display.

Figure 6:
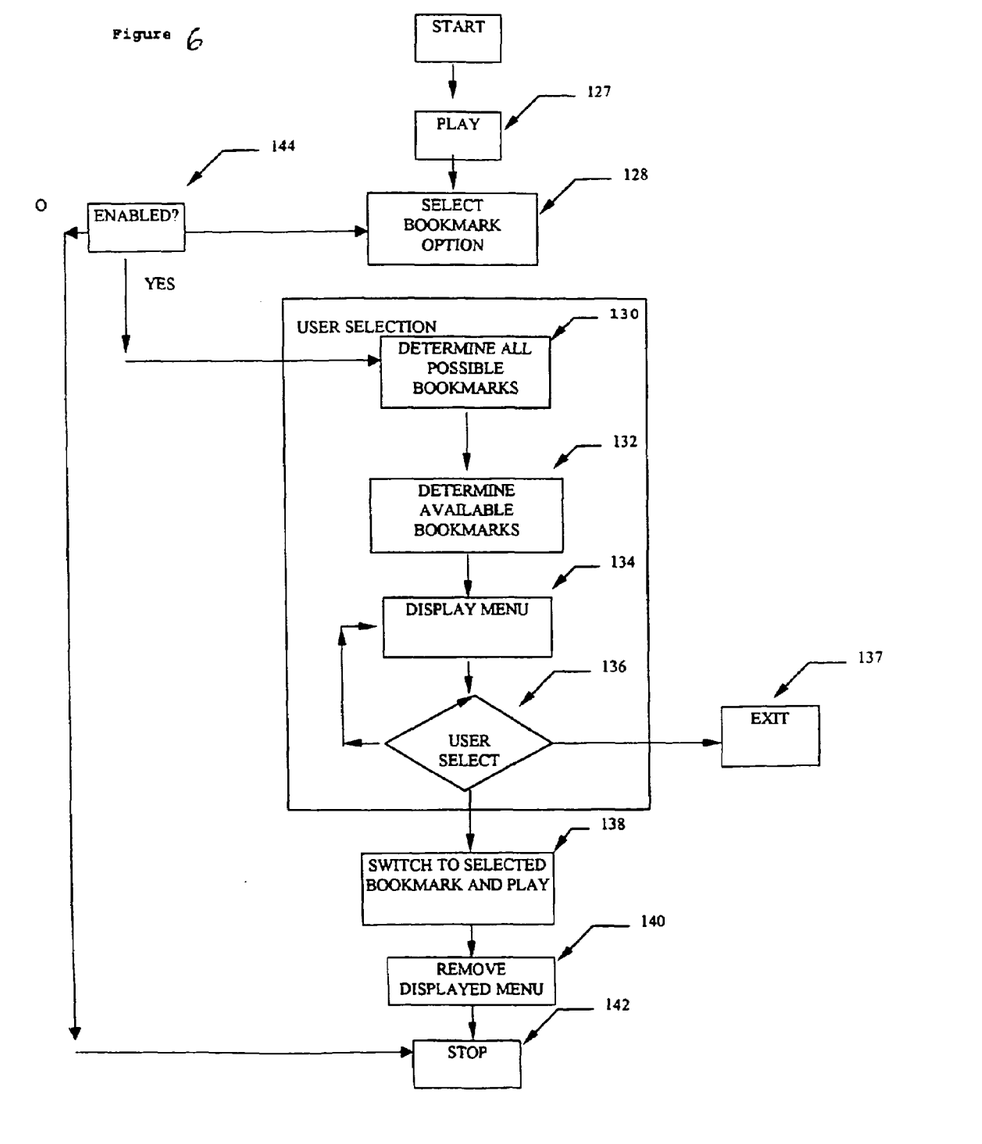
FIG. 6 shows, in flowchart form, another embodiment of the method for implementing the displaying and dynamically selecting among particular ones of a plurality of bookmarks on a DVD Player in accordance with principles of the invention.

FIG. 6 shows, in flowchart form, another embodiment of the method for implementing the displaying and dynamically selecting among particular ones of a plurality of bookmarks on a DVD Player in accordance with principles of the invention. Steps in FIG. 6 which are the same as those illustrated in FIG. 5 have the same reference number as in FIG. 5, operate in the same manner to the corresponding steps in FIG. 5 as described above, and will not be described again here. The arrangement depicted in FIG. 6 provides for selectively enabling the mode of operation in which user sets, clears and selects for playback one of a plurality of bookmarks during the playback mode of operation. Specifically, FIG. 6 includes step 144 following step 128 which tests to determine if the access to bookmark functions is enabled. If the access to bookmark functions is disabled (A "NO" result at step 144), then step 144 is followed by step 142 which exits the routine without providing the user an opportunity to set, clear, or playback from the bookmark. In this case, changing the bookmark must occur prior to activation of the playback mode by navigating the usual setup menus as described above if a user desires. Otherwise, the user is given the opportunity to set and select from among the available bookmarks in the manner described above for FIG. 5.

It is herein recognized that the present bookmark feature may be implemented using any one of a number of conventionally known methods, or combination of methods, for controlling the operation of the elements of disc player 24 described above, for example by using embedded software in a microcontroller. Also, the present override feature may be implemented for any signal processing system which can be configured to selectively restrict display contents in response to parental control ratings, or other program related information, included with stored audio, video and subpicture data, for example DVD-ROM systems, Laser Disc systems, etc. Therefore, it is to be understood that the present invention is intended to cover all modifications as would fall within the true scope and spirit of the present invention.

It will be apparent to those skilled in the art that although the present invention has been described in terms of an exemplary embodiment, modifications and changes may be made to the disclosed embodiment without departing from the essence of the invention.

The invention claimed is:

1. A method of controlling a system for processing stored information on a storage medium, comprising the steps of:
   (A) playing back stored information during a play mode of operation;
   (B) providing to a user, during play mode of operation, an opportunity to select a bookmark, representing a corresponding location at any point within the stored information, from among a plurality of bookmarks responsive to user input; and
   (C) changing to playing back the stored information from the location corresponding to the selected bookmark during the play mode of operation, wherein (B) includes
   determining a maximum number of the plurality of bookmarks which is associated with the storage medium;
   generating an on-screen menu displaying the maximum number of the plurality of bookmarks available and the actually available ones of the plurality of bookmarks associated with the storage medium, the menu allowing the user to perform one of:
   (a) set a new bookmark;
   (b) select a bookmark and clearing the selected bookmark,
   (c) select a bookmark and play back the stored information from the location corresponding to the selected bookmark, and
   (d) undo a previously performed operation
   while continuing to watch program information playback in a background portion of the video display.

2. The method of claim 1, further comprising the steps of:
   grouping the plurality of bookmarks into sets each having a predetermined number of bookmarks;
   storing each group of bookmarks; and
   providing to the user an opportunity to retrieve a desired set of bookmarks.

3. The method of claim 1, wherein:
   step (B) further comprises the step of providing to the user an opportunity to select a first and a second bookmark from among the plurality of bookmarks, and
   step (C) further comprises the step of changing to playback the stored information from the location corresponding to the first selected bookmark to the location corresponding to the location of the second bookmark.

4. The method of claim 3, wherein step (C) further comprises the step of selectively continually repeating the playback of the stored information from the location corresponding to the first selected bookmark to the location corresponding to the location of the second bookmark, in response to user control.

5. The method of claim 1, wherein the storage medium is a DVD disk, and wherein:
   the step of determining the bookmarks actually present for the particular DVD disk comprises evaluating data related to the DVD disk in non-volatile memory in the disk player.

6. The method of claim 1, wherein step (B) is preceded by the step of determining whether a mode of operation enabling user access to bookmarks during play mode of operation is enabled; and
   performing steps (B) and (C) only if the mode of operation user access to bookmarks during play mode of operation is enabled.

7. The method of claim 1, wherein the system comprises a DVD player and the storage medium comprises a DVD disk.

8. The method of claim 7, wherein the step of setting a new bookmark in response to a user command comprises storing data associated with a pause function, including the nearest NAV_PACK address, in conformance with the DVD specification.

9. The method of claim 8, wherein the step of changing playback from a new bookmarked location comprises launching a user operative RESUME command, using a stored NAV_PACK address, in conformance with the DVD specification.

10. The method of claim 1, wherein step (C) further comprises the steps of selecting a first and second bookmark and continually repeating playing back the stored information from the location corresponding to the first selected bookmark to location corresponding to the second selected bookmark.

11. Apparatus for processing information stored on a storage medium, comprising:
    a data processing unit for accessing and processing information stored on the storage medium during the play mode of operation of the apparatus:
    a user control device for receiving user input;
    an on-screen display device for generating on-screen displays; and
    a controller, coupled to the data processing unit, the user control device, and the on-screen display device, for activating the play mode of operation, and providing to a user during the play mode of operation an opportunity to access previously stored bookmarks, each bookmark representing a corresponding location at any point within the stored information, wherein
    the controller determines a maximum number of the plurality of bookmarks which is associated with the storage medium, and which of the maximum number of the plurality of bookmarks are actually available for the storage medium, and the on-screen display unit generates an on-screen menu displaying the maximum number of the plurality of bookmarks available and the actually available ones of the plurality of bookmarks associated with the storage medium, the menu allowing the user to perform one of:

(a) set a new bookmark;
(b) select a bookmark and clearing the selected bookmark,
(c) select a bookmark and playing back the stored information from the location corresponding to the selected bookmark, and
(d) allow the user to undo a previously performed operation while continuing to watch the information playback in a background portion of a video display.

* * * * *